US011996655B2

United States Patent
(12) United States Patent
Mamuro

(10) Patent No.: US 11,996,655 B2
(45) Date of Patent: May 28, 2024

(54) MULTIPOLAR CONNECTOR AND MULTIPOLAR CONNECTOR SET

(71) Applicant: Murata Manufacturing Co., Ltd., Kyoto-fu (JP)

(72) Inventor: Minoru Mamuro, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 373 days.

(21) Appl. No.: 17/543,290

(22) Filed: Dec. 6, 2021

(65) Prior Publication Data

US 2022/0094113 A1 Mar. 24, 2022

Related U.S. Application Data

(63) Continuation of application No. PCT/JP2020/021773, filed on Jun. 2, 2020.

(30) Foreign Application Priority Data

Jun. 20, 2019 (JP) ................................ 2019-114193

(51) Int. Cl.
*H01R 13/6585* (2011.01)
*H01R 12/71* (2011.01)
*H01R 13/6471* (2011.01)

(52) U.S. Cl.
CPC ......... *H01R 13/6585* (2013.01); *H01R 12/71* (2013.01); *H01R 13/6471* (2013.01)

(58) Field of Classification Search
CPC .............. H01R 13/658; H01R 13/6581; H01R 13/6585; H01R 13/6461; H01R 13/6471; H01R 12/71; H01R 12/712; H01R 12/716
(Continued)

(56) References Cited

U.S. PATENT DOCUMENTS

2018/0198242 A1 7/2018 Chuang
2022/0094113 A1* 3/2022 Mamuro ............ H01R 13/6585

FOREIGN PATENT DOCUMENTS

JP 2014-192102 A 10/2014
JP 2016-129148 A 7/2016
(Continued)

OTHER PUBLICATIONS

International Search Report issued in PCT/JP2020/021773; dated Aug. 11, 2020.
(Continued)

*Primary Examiner* — Khiem M Nguyen
(74) *Attorney, Agent, or Firm* — Studebaker & Brackett PC

(57) ABSTRACT

A multipolar connector includes a first signal terminal, a first ground terminal, an insulating member that holds the first signal and ground terminals, and an external terminal along a periphery of the insulating member. The first signal and ground terminals are arranged side by side in a direction parallel to an X-axis, extend in a direction parallel to a Y-axis orthogonal to the X-axis, and each have a first end serving as a mount portion that connects to and mounts on a mount electrode on a circuit board. When viewed in a direction parallel to a Z-axis orthogonal to the directions parallel to the X and Y axes, a mount portion of the first signal terminal is within a layout area of the external terminal. When viewed in the direction parallel to the Z-axis, a mount portion of the first ground terminal is outward from the mount portion.

20 Claims, 6 Drawing Sheets

(58) Field of Classification Search
USPC .............................................. 439/59, 607.05
See application file for complete search history.

(56) References Cited

FOREIGN PATENT DOCUMENTS

| | | | |
|---|---|---|---|
| JP | 2017-033654 | A | 2/2017 |
| JP | 2017-208165 | A | 11/2017 |
| JP | 2018-116925 | A | 7/2018 |
| WO | 2018/049686 | A1 | 3/2018 |

OTHER PUBLICATIONS

Written Opinion of the International Searching Authority issued in PCT/JP2020/021773; dated Aug. 11, 2020.

* cited by examiner

MULTIPOLAR CONNECTOR AND MULTIPOLAR CONNECTOR SET

CROSS-REFERENCE TO RELATED APPLICATIONS

This application claims benefit of priority to International Patent Application No. PCT/JP2020/021773, filed Jun. 2, 2020, and to Japanese Patent Application No. 2019-114193, filed Jun. 20, 2019, the entire contents of each are incorporated herein by reference.

BACKGROUND

Technical Field

The present disclosure relates to a multipolar connector and a multipolar connector set including a signal terminal and a ground terminal.

Background Art

Japanese Unexamined Patent Application Publication No. 2018-116925 discloses a multipolar connector formed as a multipolar receptacle or a multipolar plug. The multipolar connector includes multiple rows of internal terminals and an electrically conductive shield member disposed between the rows of the internal terminals. Shielding each row of the internal terminals from the other row reduces signal interference between the rows of the terminals.

SUMMARY

In the existing multipolar connector described in Japanese Unexamined Patent Application Publication No. 2018-116925, when the connector is viewed in its insertion-removal direction, a mount portion of a signal terminal to be mounted on a mount electrode of a circuit board extends outward beyond an external terminal. In this structure, depending on how the multipolar connector is mounted on the circuit board, the multipolar connector may cause, in a predetermined frequency band, unwanted coupling with an electronic component mounted on the circuit board, emission of electromagnetic noise to the exterior, entry of electromagnetic noise from the exterior, or other phenomena.

The present disclosure aims to provide a multipolar connector and a multipolar connector set with an enhanced performance of shielding a signal terminal and reducing the above unwanted coupling or emission and entry of electromagnetic noise.

A multipolar connector according to an example of the present disclosure includes a first signal terminal, a first ground terminal, an insulating member that holds the first signal terminal and the first ground terminal, and an external terminal disposed along a periphery of the insulating member. The first signal terminal and the first ground terminal are arranged side by side in a first direction, extend in a second direction orthogonal to the first direction, and each have a first end serving as a mount portion that is to be connected to and mounted on a mount electrode on a circuit board. When viewed in a third direction orthogonal to the first direction and the second direction, the mount portion of the first signal terminal is located within a layout area of the external terminal, and the mount portion of the first ground terminal is located outward from the mount portion of the first signal terminal.

According to a multipolar connector of the present disclosure, the entirety of the first signal terminal is located on the inner side of the external terminal, and the mount portion of the first ground terminal is located outward from the mount portion of the first signal terminal. This structure reduces scattering of electromagnetic noise from the first signal terminal to the outside, and enhances the performance of shielding the signal terminal.

DETAILED DESCRIPTION

Figure 1:
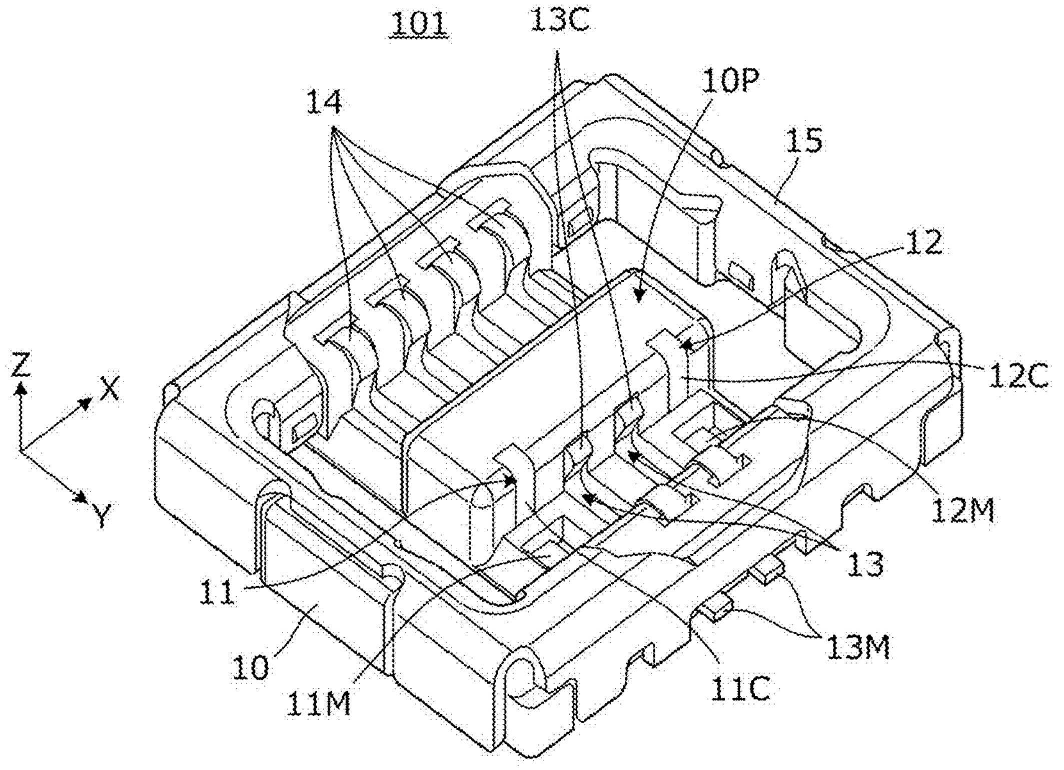
FIG. 1 is a perspective view of a multipolar connector according to an embodiment of the present disclosure.
Figure 2:
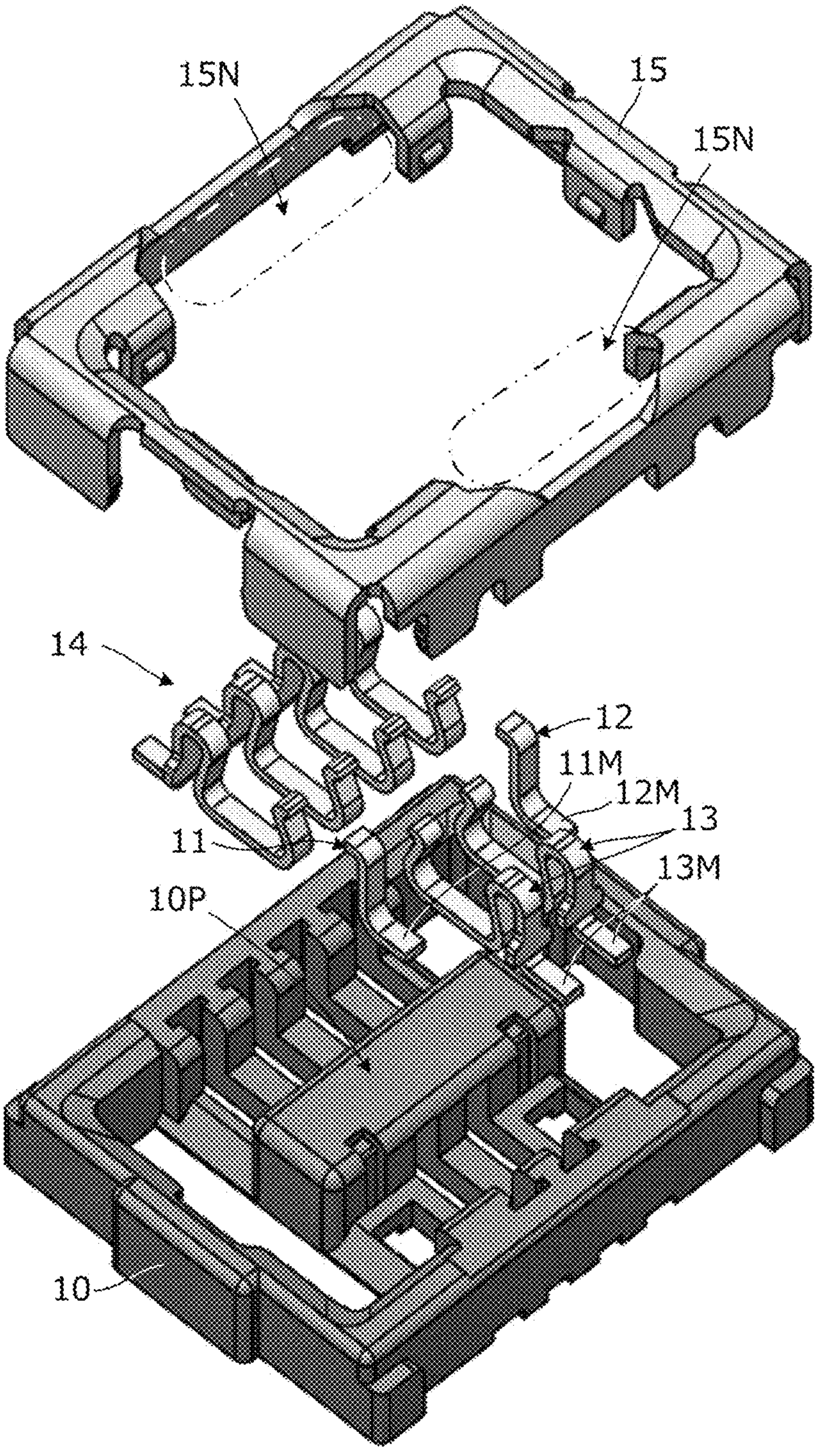
FIG. 2 is an exploded perspective view of the multipolar connector.
Figure 3:
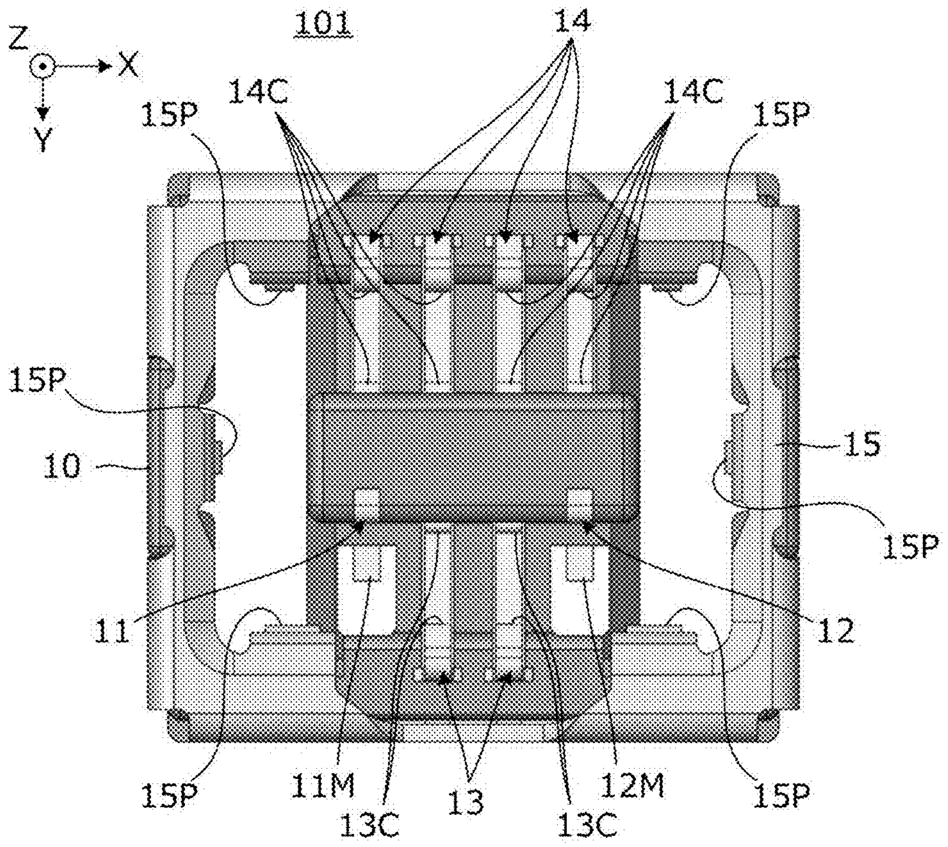
FIG. 3 is a plan view of the multipolar connector.

FIG. 1 is a perspective view of a multipolar connector 101 according to an embodiment of the present disclosure. FIG. 2 is an exploded perspective view of the multipolar connector 101. FIG. 3 is a plan view of the multipolar connector 101.

The multipolar connector 101 includes a first signal terminal 11, a second signal terminal 12, first ground terminals 13, second ground terminals 14, an insulating member 10, and an external terminal 15. The insulating member 10 holds the first signal terminal 11, the second signal terminal 12, the first ground terminals 13, and the second ground terminals 14. For example, the first signal terminal 11 and the second signal terminal 12 are formed integral with the insulating member 10. The first ground terminals 13 and the second ground terminals 14 are fitted to the insulating member 10. The insulating member 10 includes a frame portion having four sides, and a protrusion 10P disposed at a center portion of the frame portion. The insulating member 10 including the frame portion has an opening. The external terminal 15 is disposed along the periphery of the insulating member 10. The protrusion 10P of the insulating member 10 overlaps the center of the layout area of the external terminal 15, and protrudes in a Z-axis direction, described later.

The first signal terminal 11, the second signal terminal 12, and the first ground terminals 13 are arranged side by side in a direction parallel to an X-axis illustrated in FIG. 1. The first ground terminals 13 are disposed between the first signal terminal 11 and the second signal terminal 12. The multiple first ground terminals 13 are included in the present embodiment. However, one first ground terminal 13 may be exclusively included. The first signal terminal 11, the second signal terminal 12, and the first ground terminals 13 extend in a direction parallel to a Y-axis illustrated in FIG. 1. The lengths of the first signal terminal 11 and the second signal terminal 12 in the Y-axis direction are shorter than the length of the first ground terminals 13 in the Y-axis direction. The second ground terminals 14 are arranged apart from the first ground terminals 13 and side by side in a direction parallel to the X-axis. In other words, the first ground terminals 13 and the second ground terminals 14 are arranged in different rows. Here, "the direction parallel to the X-axis" corresponds to "a first direction" in the present disclosure, and "the direction parallel to the Y-axis" corresponds to "a second direction" in the present disclosure. The length in the Y-axis direction is a distance in the Y-axis direction between both ends in the Y-axis direction when viewed in the direction parallel to the Z-axis.

A first end of the first signal terminal 11 serves as a mount portion 11M that is to be connected to and mounted on a mount electrode on the circuit board. A first end of the second signal terminal 12 serves as a mount portion 12M that is to be connected to and mounted on a mount electrode on the circuit board. A first end of each of the first ground terminals 13 serves as a mount portion 13M that is to be connected to and mounted on a mount electrode on the circuit board. When viewed in the direction parallel to the Z-axis, the mount portions 11M, 12M, and 13M overlap an electroconductive binder such as solder in the first signal terminal 11, the second signal terminal 12, and the first ground terminals 13.

In FIG. 1, when viewed in the direction parallel to the Z-axis, the mount portion 11M of the first signal terminal 11 is located within the layout area of the external terminal 15. When viewed in the direction parallel to the Z-axis, the mount portion 11M of the first signal terminal 11 is exposed through the opening of the insulating member 10. When viewed in the direction parallel to the Z-axis, the mount portion 12M of the second signal terminal 12 is exposed through the opening of the insulating member 10. When viewed in the direction parallel to the Z-axis, the mount portions 13M of the first ground terminals 13 are located outward from the mount portion 11M of the first signal terminal 11 and the mount portion 12M of the second signal terminal 12. When viewed in the direction parallel to the Y-axis, the mount portion 11M of the first signal terminal 11 and the mount portion 12M of the second signal terminal 12 overlap the external terminal 15. Here, "the direction parallel to the Z-axis" corresponds to "a third direction" in the present disclosure.

Second ends of the first signal terminal 11, the second signal terminal 12, and the first ground terminals 13 are held by the protrusion 10P of the insulating member 10.

As illustrated in FIG. 3, the external terminal 15 includes six engagement protrusions 15P with which a multipolar connector 201 described later is engaged. As illustrated in FIG. 2, the external terminal 15 has a schematically rectangular frame shape and partially has cutouts 15N. As illustrated in FIG. 3, the cutouts 15N expose the first ground terminals 13 and the second ground terminals 14 when viewed in the direction parallel to the Z-axis. When viewed in the direction parallel to the Z-axis, the mount portion 11M of the first signal terminal 11 is located inward from the engagement protrusions 15P of the external terminal 15.

In the present embodiment, the first signal terminal 11 and the second signal terminal 12 are used as part of independent unbalanced-signal propagation paths. More specifically, the multipolar connector 101 and the multipolar connector 201 described later connect two signal lines to implement single-ended signaling. The first signal terminal 11 and the second signal terminal 12 are also used as part of a balanced-signal propagation path. In other words, the multipolar connector 101 and the multipolar connector 201 described later are to be connected to implement a balanced line. The signal frequency band to be used is, for example, within several tens of MHz and several tens of GHz.

As illustrated in FIG. 1, the first signal terminal 11 includes a contact portion 11C. The contact portion 11C is disposed along the side portion of the protrusion 10P while the first signal terminal 11 is held by the insulating member 10. Similarly, the second signal terminal 12 includes a contact portion 12C. The contact portion 12C is disposed along the side portion of the protrusion 10P while the second signal terminal 12 is held by the insulating member 10. Each of the first ground terminals 13 includes a contact portion 13C. The contact portion 13C is disposed along the side portion of the protrusion 10P while each first ground terminal 13 is held by the insulating member 10. As illustrated in FIG. 3, the contact portion 13C of each first ground terminal 13 is also located along the side portion of the frame portion of the insulating member 10. The contact portion 11C and the contact portion 12C are located inward from the contact portion 13C. As illustrated in FIG. 3, each of the second ground terminals 14 includes a contact portion 14C. The contact portion 14C is located along the side portion of the protrusion 10P and along the side portion of the frame portion of the insulating member 10 while each second ground terminal 14 is held by the insulating member 10.

In the multipolar connector 101 according to the present embodiment, the entirety of the first signal terminal 11 and the entirety of the second signal terminal 12 are located on the inner side of the external terminal 15. This structure reduces scattering of electromagnetic noise from the first signal terminal 11 and the second signal terminal 12 to the exterior, and has a high performance of shielding the signal terminals 11 and 12. The mount portions 13M of the first ground terminals 13 are located outward from the mount portion 11M of the first signal terminal 11 and the mount portion 12M of the second signal terminal 12. This arrangement also increases the performance of shielding the first signal terminal 11 and the second signal terminal 12.

In the multipolar connector 101 according to the present embodiment, the first ground terminals 13 are disposed between the first signal terminal 11 and the second signal terminal 12. In other words, the distance between the first signal terminal 11 and the second signal terminal 12 is wide and the first ground terminals 13 with a ground potential are interposed between the first signal terminal 11 and the second signal terminal 12. Thus, the first signal terminal 11 and the second signal terminal 12 are highly isolated from each other. This structure reduces unwanted coupling between the first signal terminal 11 and the second signal terminal 12, and reduces signal leakage or superimposition of signals.

The multipolar connector 101 according to the present embodiment includes the multiple second ground terminals 14 that are arranged apart from the multiple first ground terminals 13 and side by side in the direction parallel to the X-axis. Thus, the second ground terminals 14 also partially surround the first signal terminal 11 and the second signal terminal 12. This structure thus has a high performance of shielding the first signal terminal 11 and the second signal terminal 12.

The first ground terminals 13 and the external terminal 15 both have the ground potential, but may have a slight potential difference. In that case, parasitic resonance is caused by unwanted parasitic capacitance caused between the first ground terminals 13 and the external terminal 15 and the inductance of the first ground terminals 13. When falling within the used frequency band, this parasitic resonance frequency causes a trouble. In the multipolar connector 101 according to the present embodiment, the external terminal 15 partially includes the cutouts 15N, and does not cause unwanted parasitic capacitance between the first ground terminals 13 and the external terminal 15. The multipolar connector 101 thus reduces the above parasitic resonance.

In the multipolar connector 101 according to the present embodiment, when viewed in the direction parallel to the Z-axis, the mount portion 11M of the first signal terminal 11 is located inward from the engagement protrusions 15P of the external terminal 15. This structure thus reduces scattering of electromagnetic noise from the first signal terminal 11 and the second signal terminal 12 to the exterior, and has a high performance of shielding the signal terminals 11 and 12.

In the multipolar connector 101 according to the present embodiment, the lengths of the first signal terminal 11 and the second signal terminal 12 in the Y-axis direction are shorter than the length of the first ground terminals 13 in the Y-axis direction. This structure thus reduces scattering of electromagnetic noise from the first signal terminal 11 and the second signal terminal 12 to the exterior, and has a high performance of shielding the signal terminals 11 and 12. In addition, the first signal terminal 11 and the second signal terminal 12 are securely isolated from each other.

Figure 4:
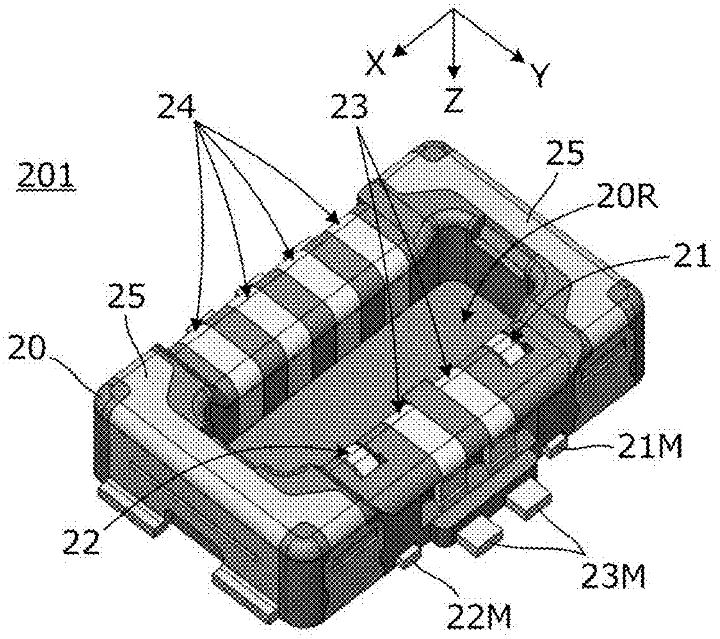
FIG. 4 is a perspective view of a multipolar connector according to an embodiment of the present disclosure.
Figure 5:
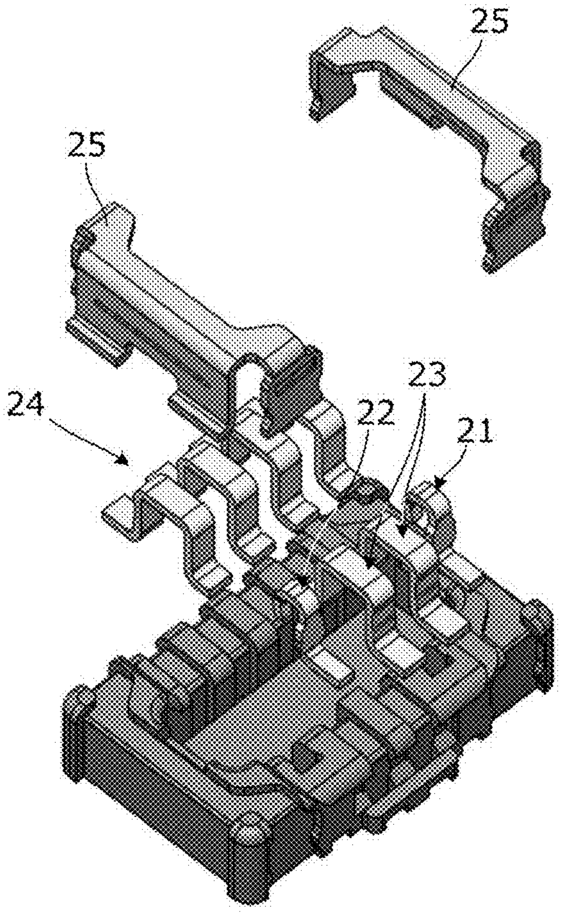
FIG. 5 is an exploded perspective view of the multipolar connector.
Figure 6:
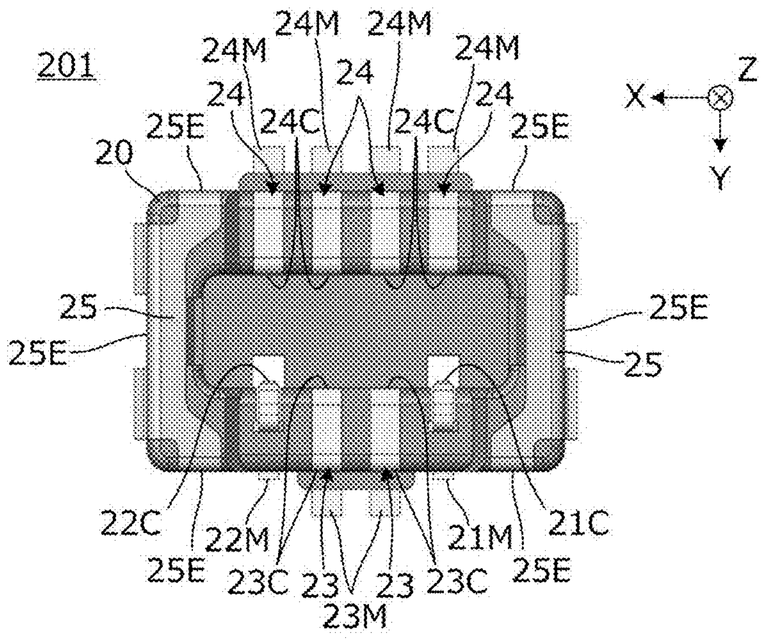
FIG. 6 is a plan view of the multipolar connector.

FIG. 4 is a perspective view of the multipolar connector 201 according to the embodiment of the present disclosure. FIG. 5 is an exploded perspective view of the multipolar connector 201. FIG. 6 is a plan view of the multipolar connector 201. The multipolar connector 101 illustrated in FIGS. 1, 2, and 3 is used as a multipolar receptacle, and the multipolar connector 201 illustrated in FIGS. 4, 5, and 6 is used as a multipolar plug. The multipolar connector 101 and the multipolar connector 201 form a multipolar connector set.

The multipolar connector 201 includes a first signal terminal 21, a second signal terminal 22, first ground terminals 23, second ground terminals 24, an insulating member 20, and two external terminals 25. The insulating member 20 holds the first signal terminal 21, the second signal terminal 22, the first ground terminals 23, and the second ground terminals 24. The insulating member 20 includes a frame portion having four sides, and a recessed portion 20R located at the center portion of the frame portion. The external terminals 25 are disposed along the periphery of the insulating member 20.

The first signal terminal 21, the second signal terminal 22, and the first ground terminals 23 are arranged side by side in the direction parallel to the X-axis illustrated in FIG. 3. The first ground terminals 23 are located between the first signal terminal 21 and the second signal terminal 22. The first signal terminal 21, the second signal terminal 22, and the first ground terminals 23 extend in the direction parallel to the Y-axis illustrated in FIG. 3. Here, "the direction parallel to the X-axis" corresponds to "the first direction" according to the present disclosure, and "the direction parallel to the Y-axis" corresponds to "the second direction" according to the present disclosure.

The first end of the first signal terminal 21 serves as a mount portion 21M that is to be connected to and mounted on the mount electrode on the circuit board, the first end of the second signal terminal 22 serves as a mount portion 22M that is to be connected to and mounted on the mount electrode on the circuit board. The first end of each first ground terminal 23 serves as a mount portion 23M that is to be connected to and mounted on the mount electrode on the circuit board. The first end of each second ground terminal 24 serves as a mount portion 24M that is to be connected to and mounted on the mount electrode on the circuit board.

When viewed in the direction parallel to the Z-axis, the mount portion 23M of each first ground terminal 23 is located outward from the mount portion 21M of the first signal terminal 21 and the mount portion 22M of the second signal terminal 22. Here, "the direction parallel to the Z-axis" corresponds to "the third direction" of the present disclosure.

As illustrated in FIG. 6, the external terminals 25 include engagement portions 25E with which the engagement protrusions 15P of the multipolar connector 101 illustrated in FIG. 3 are engaged.

When the recessed portion 20R of the multipolar connector 201 serving as a multipolar plug is fitted to the protrusion 10P of the multipolar connector 101 serving as the multipolar receptacle, the engagement protrusions 15P of the multipolar connector 101 are fixed to the engagement portions 25E of the multipolar connector 201 while being engaged with the engagement portions 25E.

Thus, while the recessed portion 20R of the multipolar connector 201 is fitted to the protrusion 10P of the multipolar connector 101, a contact portion 21C of the first signal terminal 21 of the multipolar connector 201 comes into contact with the contact portion 11C of the first signal terminal 11 of the multipolar connector 101. Similarly, a contact portion 22C of the second signal terminal 22 of the multipolar connector 201 comes into contact with the contact portion 12C of the second signal terminal 12 of the multipolar connector 101. Contact portions 23C of the first ground terminals 23 of the multipolar connector 201 come into contact with the contact portions 13C of the first ground terminals 13 of the multipolar connector 101. Similarly, contact portions 24C of the second ground terminals 24 of the multipolar connector 201 come into contact with the contact portions 14C of the second ground terminals 14 of the multipolar connector 101.

In the multipolar connector 201 according to the present embodiment, a large part of the first signal terminal 21 and a large part of the second signal terminal 22 are located on the inner side of the external terminals 25. This structure reduces scattering of electromagnetic noise from the first signal terminal 21 and the second signal terminal 22 to the exterior, and has a high performance of shielding the signal terminals 21 and 22. In addition, the mount portions 23M of the first ground terminals 23 are located outward from the mount portion 21M of the first signal terminal 21 and the mount portion 22M of the second signal terminal 22. This arrangement also enhances the performance of shielding the first signal terminal 21 and the second signal terminal 22.

In the multipolar connector 201 according to the embodiment, the first ground terminals 23 are located between the first signal terminal 21 and the second signal terminal 22, that is, the first signal terminal 21 and the second signal terminal 22 are spaced a large distance apart from each other, and the first ground terminals 23 of the ground potential are interposed between the first signal terminal 21 and the second signal terminal 22. Thus, the first signal terminal 21 and the second signal terminal 22 are highly isolated from each other. This structure reduces unwanted coupling between the first signal terminal 21 and the second signal terminal 22, and reduces signal leakage or superimposition of signals.

The multipolar connector 201 according to the present embodiment includes the multiple second ground terminals 24 that are arranged apart from the multiple first ground terminals 23 and side by side in the direction parallel to the X-axis. Thus, the second ground terminals 24 also partially surround the first signal terminal 21 and the second signal terminal 22. This structure thus has a high performance of shielding the first signal terminal 21 and the second signal terminal 22.

In FIG. 6, when viewed in the direction parallel to the Z-axis, the mount portion 21M of the first signal terminal 21 and the mount portion 22M of the second signal terminal 22 may be located within the layout area of the external terminals 25. In other words, the mount portions 21M and 22M may be arranged at portions within a rectangular range surrounded by the two external terminals 25. This arrangement causes the entirety of the first signal terminal 21 and the entirety of the second signal terminal 22 of the multipolar connector 201 to be located on the inner side of the external terminals. This structure reduces scattering of electromagnetic noise from the first signal terminal 21 and the second signal terminal 22 to the exterior, and enhances the performance of shielding the signal terminals 21 and 22.

Lastly, the description of the above embodiment is a mere example in all respects, and not limitative. Persons having ordinary skill in the art can modify or change the embodiment as appropriate. The scope of the present disclosure is defined by the scope of claims instead of the above embodiment. The scope of the present disclosure includes changes from the embodiment within the scope of claims and the scope of equivalents.

What is claimed is:

1. A multipolar connector, comprising:

a first signal terminal;

at least one first ground terminal;

an insulating member that holds the first signal terminal and the first ground terminal; and an external terminal disposed along a periphery of the insulating member, wherein the first signal terminal and the first ground terminal are arranged side by side in a first direction, extend in a second direction orthogonal to the first direction, and each have a first end serving as a mount portion that is configured to connect to and mount on a mount electrode on a circuit board, when viewed in a third direction orthogonal to the first direction and the second direction, the mount portion of the first signal terminal is located within an area surrounded by a layout area of the external terminal, when viewed in the third direction, the mount portion of the first ground terminal is located outward from the mount portion of the first signal terminal, the first signal terminal includes a first contact portion with which a signal terminal of a second multipolar connector comes into contact, the first ground terminal includes a second contact portion with which a ground terminal of the second multipolar connector comes into contact, and when viewed in the third direction, the first contact is located closer to a center of the insulating member in the second direction than is the second contact portion.

2. The multipolar connector according to claim 1, wherein the first signal terminal has a length in the second direction shorter than a length of the first ground terminal in the second direction.

3. The multipolar connector according to claim 1, comprising:

a second signal terminal extending in the second direction, located in the first direction from the first signal terminal, and having a first end serving as a mount portion that is configured to connect to the mount electrode on the circuit board, wherein the first ground terminal is disposed between the first signal terminal and the second signal terminal.

4. The multipolar connector according to claim 3, wherein the second signal terminal has a length in the second direction shorter than a length of the first ground terminal in the second direction.

5. The multipolar connector according to claim 1, wherein the at least one first ground terminal includes a plurality of first ground terminals.

6. The multipolar connector according to claim 3, wherein the first signal terminal and the second signal terminal have lengths in the second direction shorter than a length of the first ground terminal in the second direction.

7. The multipolar connector according to claim 1, further comprising:

a plurality of second ground terminals arranged apart from the first ground terminal and side by side in the first direction.

8. The multipolar connector according to claim 1, wherein when viewed in the second direction, the mount portion of the first signal terminal overlaps the external terminal.

9. The multipolar connector according to claim 3, wherein when viewed in the second direction, the mount portion of the second signal terminal overlaps the external terminal.

10. The multipolar connector according to claim 1, wherein the insulating member has an opening that exposes the mount portion of the first signal terminal when viewed in the third direction.

11. The multipolar connector according to claim 3, wherein the insulating member has an opening that exposes the mount portion of the first signal terminal when viewed in the third direction, and an opening that exposes the mount portion of the second signal terminal when viewed in the third direction.

12. The multipolar connector according to claim 1, wherein the insulating member includes a protrusion that overlaps a center portion of the layout area of the external terminal and that protrudes in the third direction, and second ends of the first signal terminal and the first ground terminal are held by the protrusion.

13. The multipolar connector according to claim 1, wherein the external terminal includes an engagement protrusion that is configured to engage with an external terminal of the second connector, and when viewed in the third direction, the mount portion of the first signal terminal is located closer to the center of the insulating member in the second direction than is the engagement protrusion.

14. The multipolar connector according to claim 1, wherein the external terminal partially has a cutout, and when viewed in the third direction, the cutout exposes the first ground terminal.

15. The multipolar connector according to claim 2, comprising:

a second signal terminal extending in the second direction, located in the first direction from the first signal terminal, and having a first end serving as a mount portion that is configured to connect to the mount electrode on the circuit board, wherein the first ground terminal is disposed between the first signal terminal and the second signal terminal.

16. The multipolar connector according to claim 2, wherein the at least one first ground terminal includes a plurality of first ground terminals.

17. The multipolar connector according to claim 4, wherein the first signal terminal and the second signal terminal have lengths in the second direction shorter than a length of the first ground terminal in the second direction.

18. The multipolar connector according to claim 2, further comprising:

a plurality of second ground terminals arranged apart from the first ground terminal and side by side in the first direction.

19. The multipolar connector according to claim 2, wherein when viewed in the second direction, the mount portion of the first signal terminal overlaps the external terminal.

20. A multipolar connector set, comprising:

a first multipolar connector and a second multipolar connector that are configured to fit to each other, wherein the first multipolar connector is the multipolar connector according to claim 1, the insulating member of the first multipolar connector includes a protrusion, and second ends of the first signal terminal and the first ground terminal of the first multipolar connector are arranged along a side portion of the protrusion, an insulating member of the second multipolar connector includes a recessed portion, and second ends of a first signal terminal and a first ground terminal of the second multipolar connector are arranged along a side portion of the recessed portion, fitting the first multipolar connector and the second multipolar connector to each other brings the first signal terminal of the first multipolar connector and the first signal terminal of the second multipolar connector into contact with each other, and brings the first ground terminal of the first multipolar connector and the first ground terminal of the second multipolar connector into contact with each other, and a mount portion of the first signal terminal of the second multipolar connector is located within the layout area of the external terminal of the first multipolar connector.

* * * * *